United States Patent
Fry et al.

(10) Patent No.: US 6,172,833 B1
(45) Date of Patent: Jan. 9, 2001

(54) RETRIEVAL OF SERPENTINE PATTERN DATA USING A MEMORY DEVICE OF A TAPE CARTRIDGE

(75) Inventors: Scott Milton Fry, Oro Valley; Steven Douglas Johnson; Steven Bennett Wilson, both of Tucson, all of AZ (US)

(73) Assignee: International Business Machines Corporation, Armonk, NY (US)

( * ) Notice: Under 35 U.S.C. 154(b), the term of this patent shall be extended for 0 days.

(21) Appl. No.: 09/128,737

(22) Filed: Aug. 5, 1998

(51) Int. Cl.$^7$ ................................................ G11B 15/18
(52) U.S. Cl. ............................................. 360/71; 360/92
(58) Field of Search ........................... 360/71, 92, 132, 360/93, 48, 72.2, 72.1; 711/4

(56) References Cited

U.S. PATENT DOCUMENTS

| | | | |
|---|---|---|---|
| 4,338,644 | * 7/1982 | Staar | 360/722 X |
| 4,796,110 | 1/1989 | Glass et al. . | |
| 4,858,039 | 8/1989 | Mintzlaff . | |
| 5,121,270 | 6/1992 | Alcudia et al. . | |
| 5,291,346 | 3/1994 | Baekgaard . | |
| 5,369,532 | 11/1994 | Dodt et al. . | |
| 5,373,485 | 12/1994 | Hogan et al. . | |
| 5,438,674 | 8/1995 | Keele et al. . | |
| 5,485,321 | 1/1996 | Leonhardt et al. . | |
| 5,485,606 | 1/1996 | Midgdey et al. . | |
| 5,613,082 | 3/1997 | Brewer et al. . | |
| 5,717,951 | 2/1998 | Yabumoto . | |
| 5,757,571 | * 5/1998 | Basham et al. | 360/48 X |
| 5,867,335 | * 2/1999 | Ozue et al. | 360/71 |

FOREIGN PATENT DOCUMENTS

| | | |
|---|---|---|
| 7-114443 | 5/1995 | (JP) . |
| 95-114443 | 5/1995 | (JP) . |
| 8-235775 | 9/1996 | (JP) . |

OTHER PUBLICATIONS

Hillyer, Bruce K., et al., "Random I/O Scheduling in Online Tertiary Storage Systems", *ACM Conference*, 1996, pp. 195–204.

* cited by examiner

*Primary Examiner*—Alan T. Faber
(74) *Attorney, Agent, or Firm*—John H. Holcombe; Robert H. Sullivan

(57) ABSTRACT

A data storage system for use with a tape cartridge storing data in a serpentine pattern on tape media, and having a memory device for storing a device block map for the tape median, comprises tape drive, or a loading mechanism, which first positions the tape cartridge at memory interface for transfering the device block map from the memory device to a processor, and subsequently positions the tape media for reading and/or writing. The processor processes the device block map from the memory device for optimal retrieval of the serpentine pattern data of the tape media. The processing of the device block map occurs while the tape media is positioned for reading and/or writing, so that the processor begins the retrieval reading process immediately upon the positioning of the tape media. In another aspect of the invention, a robotic accessor of an automated data storage library moves the tape cartridge to the tape drive. The tape cartridge is positioned at the memory interface on the robotic accessor, and the stored device block map is transferred from the memory device to the processor, during the move.

22 Claims, 6 Drawing Sheets

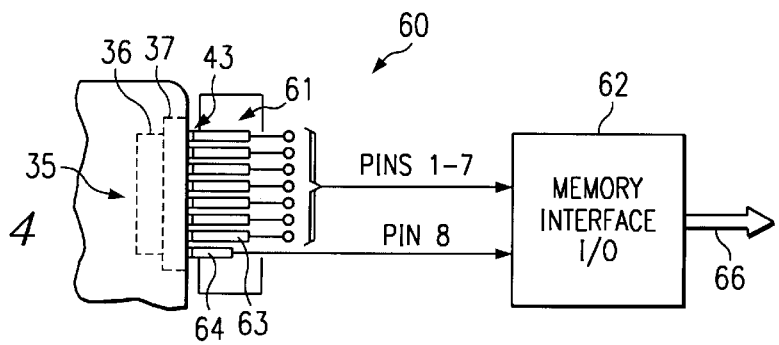
FIG. 4
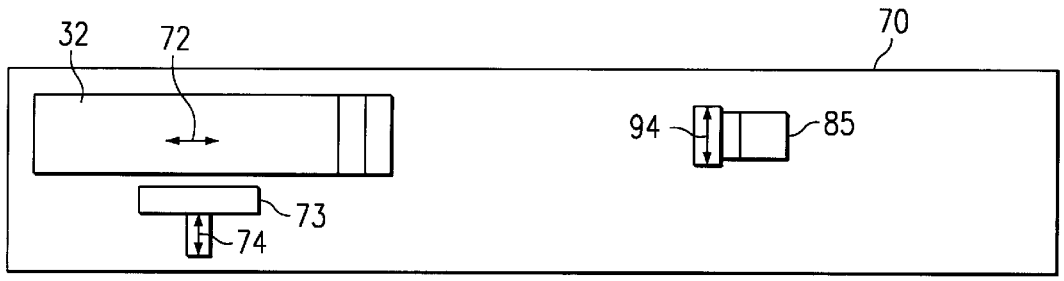
FIG. 5A
FIG. 5B

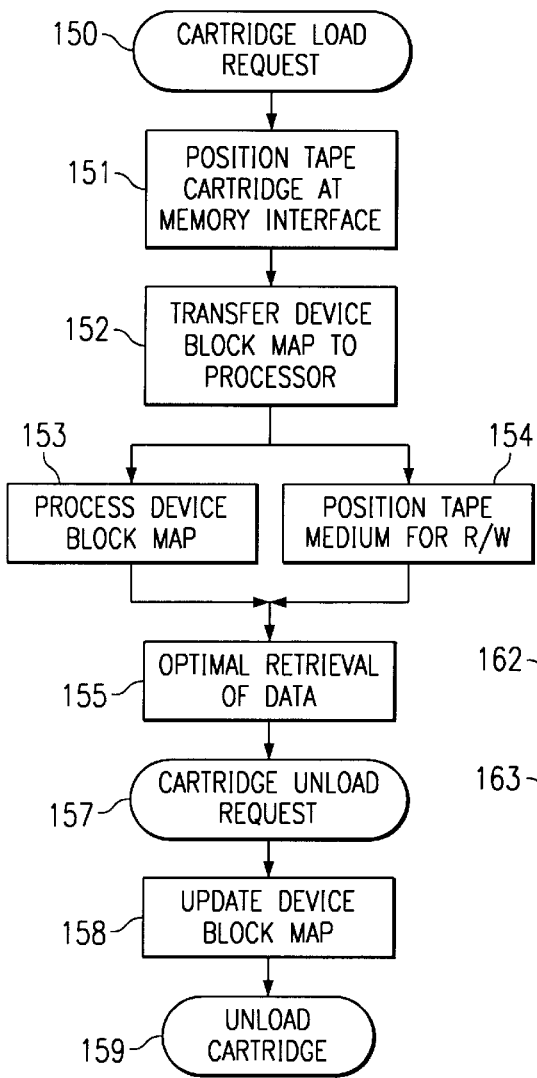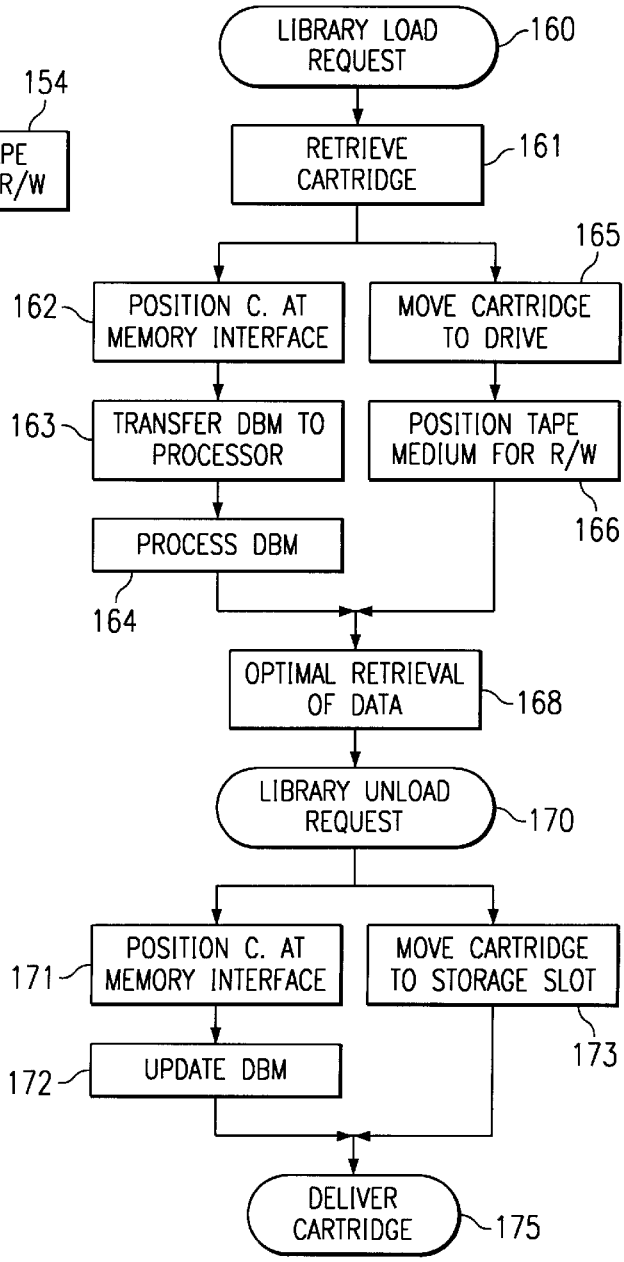

RETRIEVAL OF SERPENTINE PATTERN DATA USING A MEMORY DEVICE OF A TAPE CARTRIDGE

TECHNICAL FIELD

This invention relates to the retrieval of data stored on tape media, and, more particularly, to the speed of accessing and optimized retrieval of data stored in a serpentine pattern on tape media.

BACKGROUND OF THE INVENTION

Tape data storage is typically used for backup, archival, and/or sequential data processing purposes. Examples of sequential processing are batch updating of master files or data mining where queries are aggregated in one complete sequential scan of the data. The random retrieval of data from a sequentially recorded pattern has been relatively simple, moving longitudinally along the tape media in a sequential manner.

In the data processing industry, tape media is known for storing large quantities of data in parallel tracks which extend longitudinally of the tape. The most modern longitudinal tape formats for storing data on tape media, such as magnetic tape cartridges, are described as "serpentine", and have higher track densities by having sets of tracks in both the "out" and "in" directions. For example, the IBM 3570 and IBM 3590 tape drives have 16 "out" tracks, 16 "in" tracks, and 4 "out" and "in" tracks. Access to data is accomplished by indexing the tape heads laterally of the tape media, a process that is very rapid as compared to searching the length of the tape media.

A serpentine longitudinal tape drive records data on a wrap (a track in a single direction) or a set of wraps in one direction along a length of the serpentine longitudinal tape media. Then, the tape drive shifts its recording heads laterally of the tape media a small distance and reverses the tape direction to record another wrap or set of wraps in the opposite direction along the length of the tape media. The tape drive continues these operations back and forth along the serpentine longitudinal tape media until all of blocks of data are written.

Since the physical locations of the data blocks longitudinally along the tape media are staggered back and forth along the tape and not in any sequential order, a straightforward sequential retrieval order of access to the data blocks is most likely not the optimal order of retrieval. Indeed, for data recorded on tape media in a serpentine pattern, the retrieval of blocks of data spaced relatively far apart on the tape will likely result in grossly sub-optimal performance, if the blocks of data are retrieved in sequential order with respect to the order they were written.

Various techniques and systems exist for recording data on and retrieving data from a tape media in a serpentine pattern.

The speed of initial access to the data stored in a serpentine pattern is relatively slow, however.

In tape drives for data stored in a serpentine pattern on a tape media, the tape head typically comprises both servo and data heads which are parallel and spaced apart a certain amount. A servo system in the tape drive employs the servo heads to follow servo tracks on the tape media, while the data heads read and/or write data on the data tracks. Also, when the serpentine data tape media is in a cartridge, a period of time is required for loading the tape cartridge into the drive. Once the cartridge is loaded, an additional period of time is required to thread or move the tape media so that it is in proximity to the tape head. Then, a further period of time is required for the tape drive servo arrangement to initialize the positioning of the tape media with respect to the tape head. This comprises moving the tape longitudinally while the servo arrangement adjusts the lateral positioning of the tape head so that the servo head is properly aligned with the desired servo track and the data head(s) is aligned with the corresponding data wrap (or group of wraps).

In a single reel tape cartridge the device block map is typically at the beginning of the tape. Thus, after the tape leader has been loaded by threading, and the servo head has been properly aligned, the tape data head reads the device block map and a processor processes the device block map in view of the incoming data retrieval request to optimize the retrieval order.

In a reel-to-reel tape cartridge (or cassette), the device block map is typically at the midpoint of the length of tape and the cartridge is stored with an equal amount of tape on each reel. Thus, after the tape or tape head has been moved, typically in a direction normal to the surface of the tape, into proximity to each other, and the servo head has been properly aligned, the tape data head reads the device block map and a processor processes the device block map in view of the incoming data retrieval request to optimize the retrieval order.

If the cartridge is stored in an automated tape library, such as an IBM 3575 Tape Library Dataserver, a still further amount of time is required to retrieve the cartridge from its storage slot and move the cartridge and deliver it to the tape drive.

SUMMARY OF THE INVENTION

It is an object of the present invention to increase the speed of accessing data stored in a serpentine pattern on a tape media, while achieving the optimized retrieval of such data.

Disclosed is a data storage system for use with a tape cartridge having a tape media storing data in a serpentine pattern, and having a memory device for storing a device block map for the tape media. The storage system has a memory interface for transferring data with the memory device and a tape drive for reading and/or writing data on the tape media. The tape drive, or a loading mechanism, first positions the tape cartridge at the memory interface, and subsequently positions the tape media for reading and/or writing. A processor is coupled to the memory interface and processes the device block map from the memory device for optimal retrieval of the serpentine pattern data of the tape media by the tape drive. The transfer of the device block map from the memory device and the processing of the device block map occurs while the tape drive or loading mechanism positions the tape media for reading so that the processor begins the reading process immediately upon the positioning of the tape media.

In another aspect of the invention, the tape cartridge is stored in one of a plurality of storage slots of an automated data storage library having a robotic accessor for moving the tape cartridge amongst the storage slots and at least one tape drive. In an initial step, the robotic accessor moves the tape cartridge to the tape drive. The memory interface is at the robotic accessor, and the tape cartridge is positioned at the memory interface during the move, and the stored device block map is transferred from the memory device at the memory interface to the processor, also during the move.

For a fuller understanding of the present invention, reference should be made to the following detailed description taken in conjunction with the accompanying drawings.

BRIEF DESCRIPTION OF THE DRAWINGS

FIG. 4 is a diagrammatic representation and block diagram depicting an embodiment of a memory interface employed in the present invention;

FIGS. 5A and 5B are diagrammatic representations and block diagrams of an embodiment of a tape drive in accordance with the present invention, for a single reel tape cartridge;

FIGS. 9 and 10 are flow charts depicting alternative embodiments of the method of the present invention.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
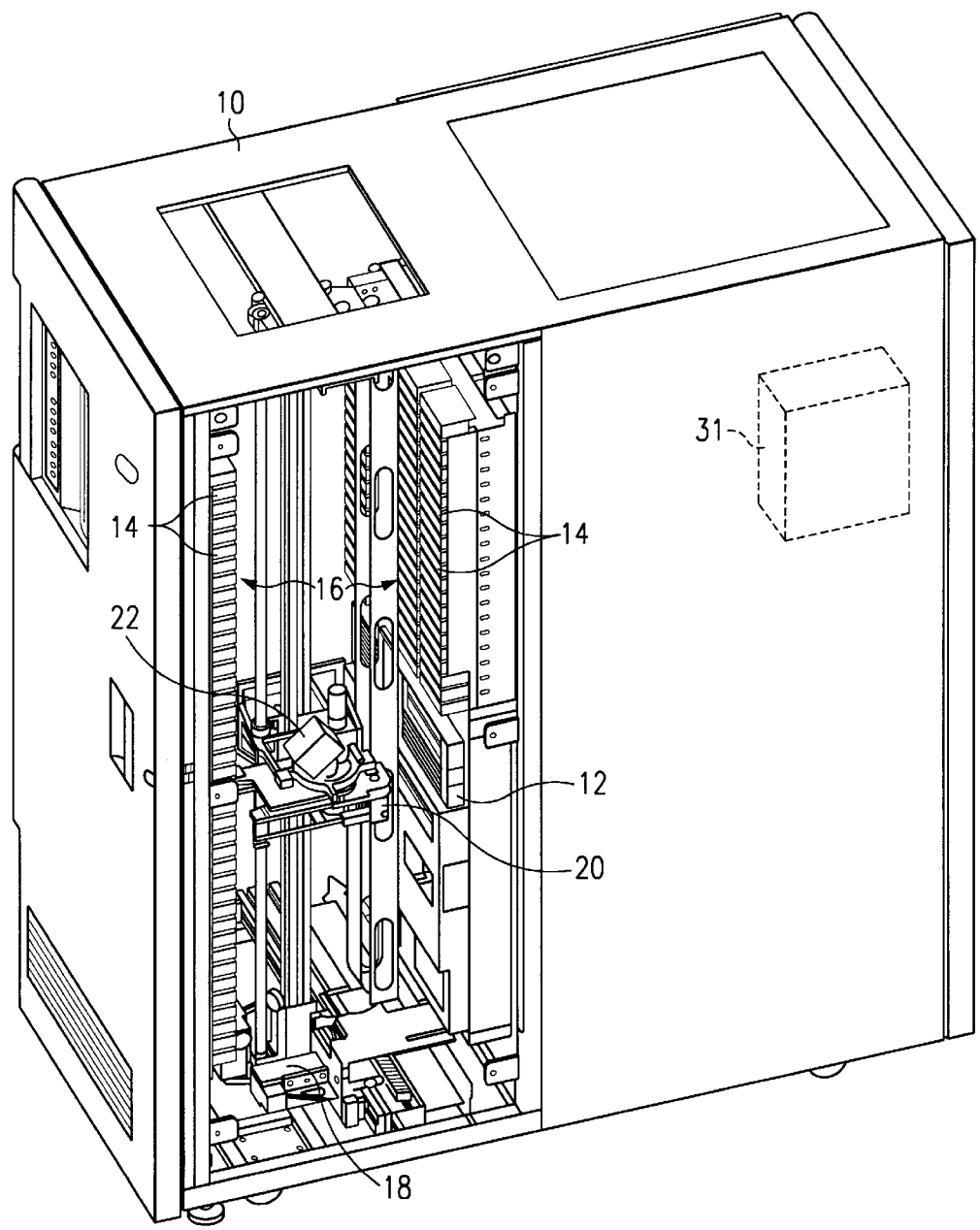
FIG. 1 is a perspective view of an automated data storage library employing the present invention.

Referring to FIG. 1, an embodiment of an automated data storage library 10 is illustrated employing the data storage system of the present invention. The invention is equally applicable to tape drives not located in libraries, and may be advantageously employed to speed the access to data, for example, by tape drives with cartridges in automated cartridge loaders. However, time to data is of greatest criticality in automated data storage libraries.

The automated data storage library 10 includes a plurality of tape drives 12, for example, for reading and/or writing on tape media, such as single reel or two reel magnetic tape cartridges. A plurality of tape media 14 are stored in banks or groups of storage slots 16. Tape media may encompass a variety of media, such as that contained in magnetic tape cartridges, magnetic tape cassettes, and optical tape cartridges, in various formats. For universal reference to any of these types of media, the terms "tape media" or "media" are used herein, and any of these types of containers are referred to as "tape cartridges" or "cartridges" herein.

An accessor robot 18, including a cartridge picker 20 and a bar code reader 22 mounted on the picker, transports a selected cartridge 14 between a storage slot 16 and a drive 12.

An example of an automated data storage library 10 is the IBM 3575 Tape Library Dataserver, which stores magnetic tape cartridges and employs 3570 tape drives.

The library 10 also includes a library controller 31 which comprises at least one micro-processor. The library controller may serve both to provide the inventory of the entire library and to control the library. Typically, the library controller 31 comprises at least one data processor and suitable memory and data storage capability to control the operation of the library 10. The library controller 31 may comprise any suitable microprocessor, such as an IBM RS/6000 processor.

The library controller 31 controls the actions of the accessor robot 18. The conventional library controller 31 is interconnected through a provided interface to one or more host processors, which provides commands requesting access to particular tape media or to media in particular storage slots. The host, either directly, or through the library controller, controls the actions of the data storage drives 12 (through their associated controllers). Commands for access to data or to locations on the tape media and information to be recorded on, or to be read from, selected tape media are typically transmitted directly between the drives 12 and the host. The library controller 31 is typically provided with a database, which includes tables and programs, typically for locating the tape cartridges in the appropriate storage slots 16 and for maintaining the inventory of the tape cartridges.

The accessor robot 18 typically includes servos, motors, arms, the picker 20 with grippers, sensors and other robotic, mechanical and electrical equipment to perform functions that include (at least) the accessing and transporting of tape media between and among the storage slots 16 and the tape drives 12.

As described above, the speed of access to a cartridge stored in an automated tape library, such as an IBM 3575 Tape Library Dataserver, is limited by the amount of time required to retrieve the cartridge from its storage slot and move the cartridge and deliver it to the tape drive. Then, the cartridge is loaded into the tape drive. Once the cartridge is loaded, an additional period of time is required to thread or move the tape media so that it is in proximity to the tape head.

However, when that cartridge stores data in a serpentine pattern, the speed of initial access to the data is slowed even further.

In tape drives for data stored in a serpentine pattern on a tape media, the tape head typically comprises both servo and data heads which are parallel and spaced apart a certain amount. A servo system in the tape drive employs the servo heads to follow servo tracks on the tape media, while the data heads read and/or write data on the data tracks. Thus, after the tape is in proximity to the tape head, a further period of time is required for the tape drive servo arrangement to initialize the positioning of the tape media with respect to the tape head. This comprises moving the tape longitudinally while the servo arrangement adjusts the lateral positioning of the tape head so that the servo head is properly aligned with the desired servo track and the data head(s) is aligned with the corresponding data wrap (or group of wraps).

Only after the alignment of the tape head laterally with respect to the tape media, can the device block map be read for determining the optimized order of retrieving files of data stored in a serpentine pattern on a tape media.

In a single reel tape cartridge the device block map is typically at the beginning of the tape. Thus, after the tape leader has been loaded by threading, and the servo head has been properly aligned, the tape data head reads the device block map and a processor processes the device block map in view of the incoming data retrieval request to optimize the retrieval order.

In a reel-to-reel tape cartridge (or cassette), the device block map is typically at the midpoint of the length of tape and the cartridge is stored with an equal amount of tape on each reel. Thus, after the tape or tape head has been moved, typically in a direction normal to the surface of the tape, into proximity to each other, and the servo head has been properly aligned, the tape data head reads the device block map and a processor processes the device block map in view of the incoming data retrieval request to optimize the retrieval order.

"Retrieval" of data records primarily comprises the reading of the records. However, retrieval for the purpose of reading and then rewriting one or more of the records, or for writing over one or more of the records is possible. Hereinafter, although reading is emphasized, the "retrieved" records may be read and/or written.

Figures 2A, 2B:
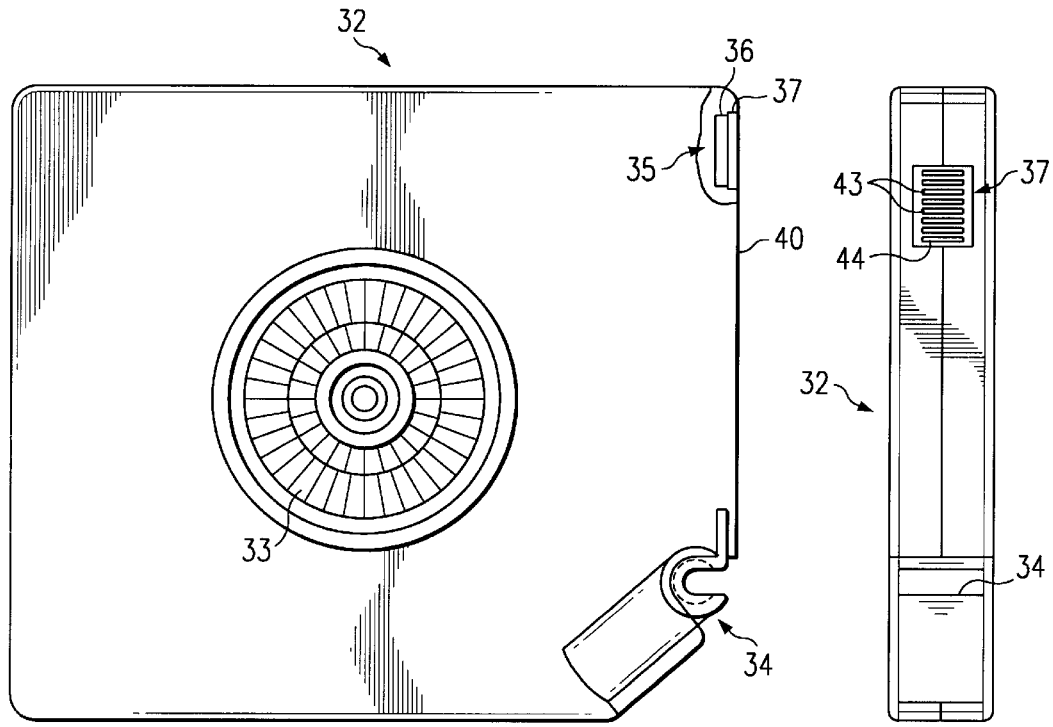
FIGS. 2A and 2B are respectively plan and side views of a single reel tape cartridge having a memory device employed in the automated data storage library of FIG. 1.

The present invention employs a memory device, such as memory circuits as discussed in U.S. Pat. No. 4,338,644, Staar, to store a device block map. FIGS. 2A and 2B illustrate a single reel magnetic tape cartridge 32 having a drive hub 33 and a leader block 34. A memory device 35 comprising a memory circuit module 36, such as an EPROM semiconductor memory chip, mounted on board 37 is located at the edge 40 of the cartridge. The opposite side of board 37 comprises a plurality of conductive bars 43 and a common conductive bar 44, which provide external electrical connections to the memory circuit module 36. The conductive bars 43 provide a high speed electronic connection between the memory circuit module and connecting terminals, as will be explained, and the conductive bar 44 may provide a ground for preventing electrostatic discharge to the memory circuit module and may identify the orientation of the module.

Alternative memory devices 35 may be employed in accordance with the invention, such as a rewritable magnetic chip, or other types of electronically alterable read only memory chips. Alternative external connections to the memory module may also be utilized, such as an LED transmitter/receiver, or other types of proximity communications.

Figure 3:
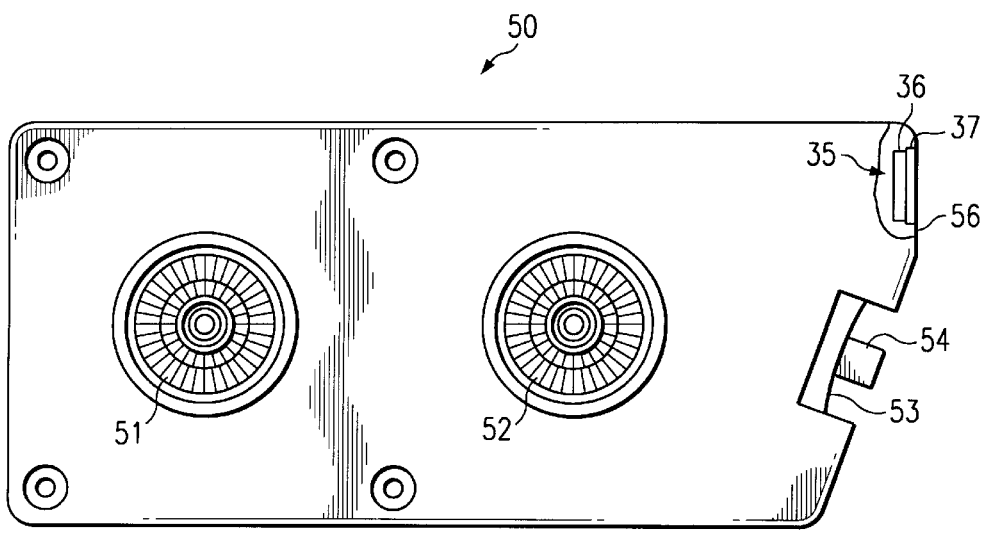
FIG. 3 is a plan view of a two reel tape cartridge having a memory device employed in the automated data storage library of FIG. 1.

A two reel cartridge 50 is illustrated in FIG. 3 having drive hubs 51 and 52 for driving the tape media 53 past a tape head 54 (the tape head is in the associated tape drive). As with respect to the single reel tape cartridge, above, the two reel cartridge of the present invention has a memory device 35 comprising a memory circuit module 36 mounted on board 37. The board 37 is located at the edge 56 of the cartridge, and the opposite side of board 37 comprises a plurality of conductive bars which provide external electrical connections to the memory circuit module 36.

FIG. 4 illustrates an embodiment of a memory interface 60 having fixed terminals 61 and memory interface input/output circuitry 62. Connectors 63 provide electrical connections to the conductive bars 43 of the memory device 35 in one of the cartridges to provide a high speed electronic connection between the memory circuit module and memory interface 60. A connector 64 provides an electrical connection to the conductive bar 44 and may provide a ground for preventing electrostatic discharge to the memory circuit module and may identify the orientation of the module. The memory interface 60 is coupled to a processor by cable 66 (as will be explained) and provides a bidirectional communication with the processor.

FIGS. 5A and 5B illustrate an embodiment of a single reel tape drive 70 which incorporates the data storage system of the present invention. The tape drive 70 may be located in library 10 or may be a separate drive, as discussed above. Conventional elements of the tape drive include a loader 71, which is a mechanism, operated by drive servos 80, which moves a cartridge 32 into and out of the tape drive 70 in the direction of arrows 72 and either moves the cartridge vertically or moves a clutch 73 vertically in the direction of arrows 74. The vertical movement of the cartridge or the vertical movement of the clutch brings the clutch 73 into engagement with the hub 33 of the cartridge 32 (see FIG. 2A). A tape threader 76 engages the tape cartridge leader block 34, and, while the drive servos 80 cause a motor 81 to rotate the clutch 73 to release and unwind the tape media, drive servos operate the tape threader 76 to move the tape media along path 83 past and into engagement with "D" bearings 84 and tape head 85, and into engagement with a take-up reel 86. After the threading operation is complete, a drive controller 90 and head servos 92 operate a head servo-mechanism 93 to move the tape head 85 vertically in the directions of arrows 94 while the drive controller and drive servos 80 operate motor 81 and take-up reel 86 to move the tape media in the longitudinal direction. The vertical movement of head 85 brings the servo head, and therefore the data heads, into alignment.

In the embodiment of FIGS. 5A and 5B, memory interface 60 is located in the tape drive 70 so that the loader 71 first positions the memory device 35 at the memory interface 60 by the insert motion of arrows 72. During any subsequent vertical motion of the cartridge 32, the conductive bars of the memory device 35 will maintain contact with the memory interface 60. Upon making contact, memory interface 60 transfers the device block map from the memory device 35 to the controller 90. The controller 90 comprises a data processor and includes a memory 91. The controller processor may have the capability of processing the device block map. Otherwise, the controller 90 forwards the device block map over host interface 95 to a host 96 for processing. The host (or controller) processor then processes the device block map to order the desired host-initiated retrieval read requests into an optimal order (e.g., in accordance with the incorporated Basham et al. application).

In accordance with the present invention, subsequently to positioning the memory device 35 at the memory interface 60, the tape media is threaded and the servoing of the tape head 85 is conducted to position the tape media for reading and/or writing.

Thus, the transfer of the device block map from the memory device and the processing of the device block map occurs while the tape drive or loading mechanism positions the tape media for reading and/or writing so that the processor begins the retrieval reading process immediately upon the positioning of the tape media. The retrieval reading process is conducted by the controller 90 under the commands of the host 96, and the data is read and/or written by tape head 85 and decoded, etc., by data flow 97 and the data transferred directly with the host 96 over host interface 95.

Figure 6A:
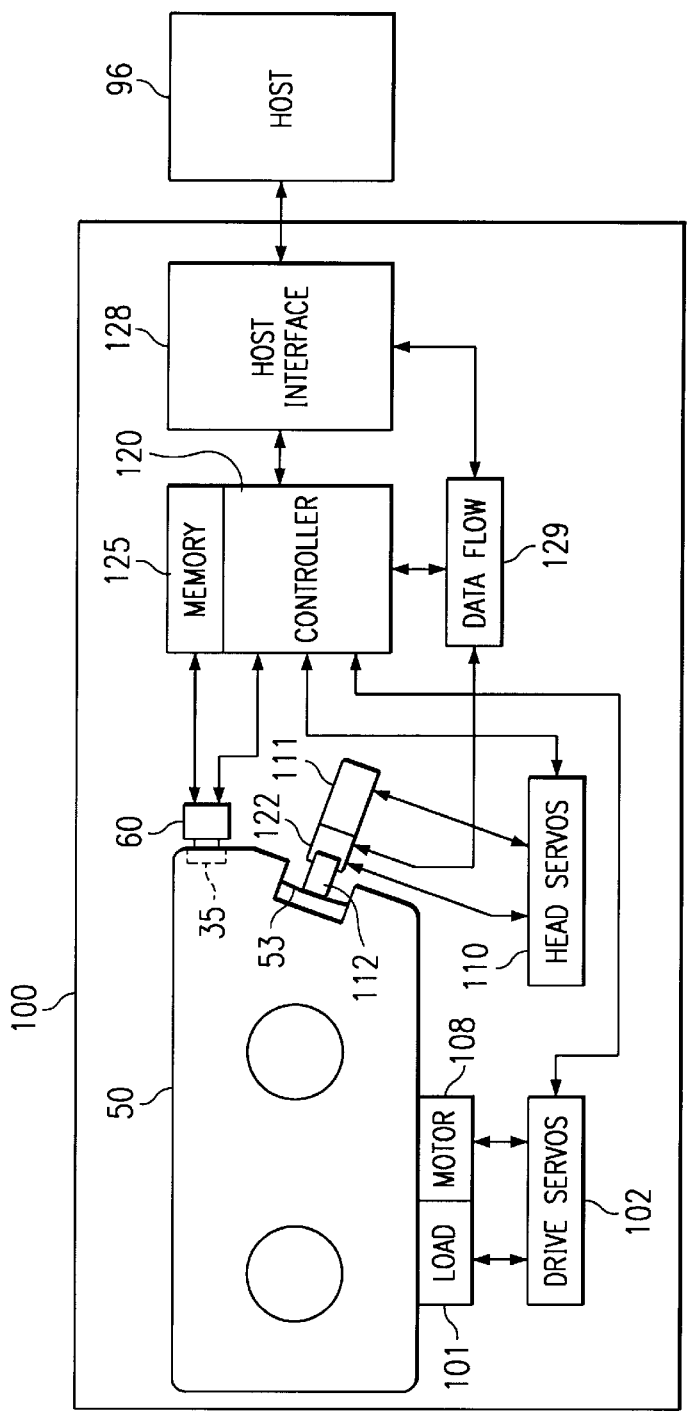
FIGS. 6A and 6B are diagrammatic representations and block diagrams of an embodiment of a tape drive in accordance with the present invention, for a two reel tape cartridge.
Figure 6B:
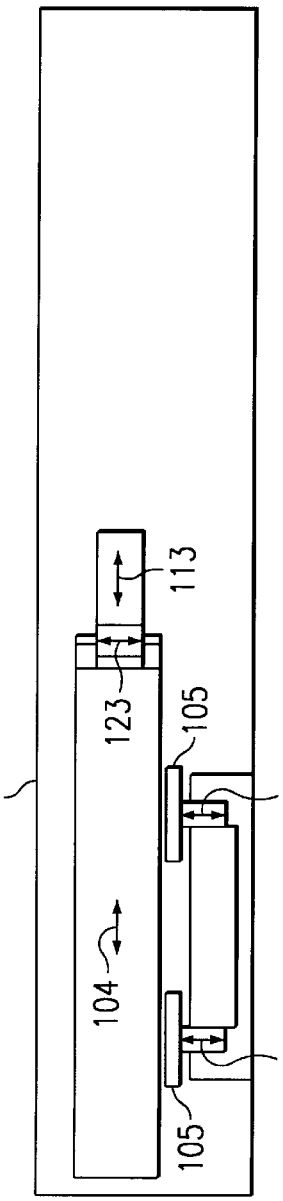

FIGS. 6A and 6B illustrate an embodiment of a two reel tape drive 100 which incorporates the data storage system of the present invention. The tape drive 100 may be located in library 10 or may be a separate drive, as discussed above. Conventional elements of the tape drive include a loader 101, which is a mechanism, operated by drive servos 102, which moves a two reel cartridge 50 into and out of the tape drive 100 in the direction of arrows 104 and either moves the cartridge vertically or moves clutches 105 vertically in the direction of arrows 106. The vertical movement of the cartridge or the vertical movement of the clutch brings the clutches 105 into engagement with the hubs 51 and 52 of the cartridge 50 (see FIG. 3). The drive servos 102 causes a motor 108 to rotate the clutches 105 to wind and unwind the tape media to tension the tape media 53. Head servos 110 operate a head positioner 111 to move a tape head 112 in the direction of arrows 113 into engagement with the tape media 53. After the tape head is in engagement with the tape media, a drive controller 120 and head servos 110 operate a head servo-mechanism 122 to move the tape head 112 vertically in. the directions of arrows 123 while the drive controller and drive servos 102 operate motor 108 to move the tape media in the longitudinal direction. The vertical movement of head 112 brings the servo head, and therefore the data heads, into alignment.

In the embodiment of FIGS. 6A and 6B, memory interface 60 is located in the tape drive 100 so that the loader 101 first positions the memory device 35 at the memory interface 60 by the insert motion of arrows 104. During any subsequent vertical motion of the cartridge 50, the conductive bars of the memory device 35 will maintain contact with the memory interface 60. Upon making contact, memory interface 60 transfers the device block map from the memory device 35 to the controller 120. The controller 120 comprises a data processor and includes a memory 125. The controller processor may have the capability of processing the device block map. Otherwise, the controller 120 forwards the device block map over host interface 128 to the host 96 for processing. The host (or controller) processor then processes the device block map to order the desired host-initiated retrieval read requests into an optimal order.

In accordance with the present invention, subsequently to positioning the memory device 35 at the memory interface 60, the tape media is positioned with respect to the tape head 112 and the servoing of the tape head 112 is conducted to position the tape media for reading and/or writing.

Thus, the transfer of the device block map from the memory device and the processing of the device block map occurs while the tape drive or loading mechanism positions the tape media for reading and/or writing so that the processor begins the retrieval reading process immediately upon the positioning of the tape media. The retrieval reading process is conducted by the controller 120 under the commands of the host 96, and the data is read and/or written by tape head 112 and decoded, etc., by data flow 129 and the data transferred directly with the host 96 over host interface 128.

Figure 7:
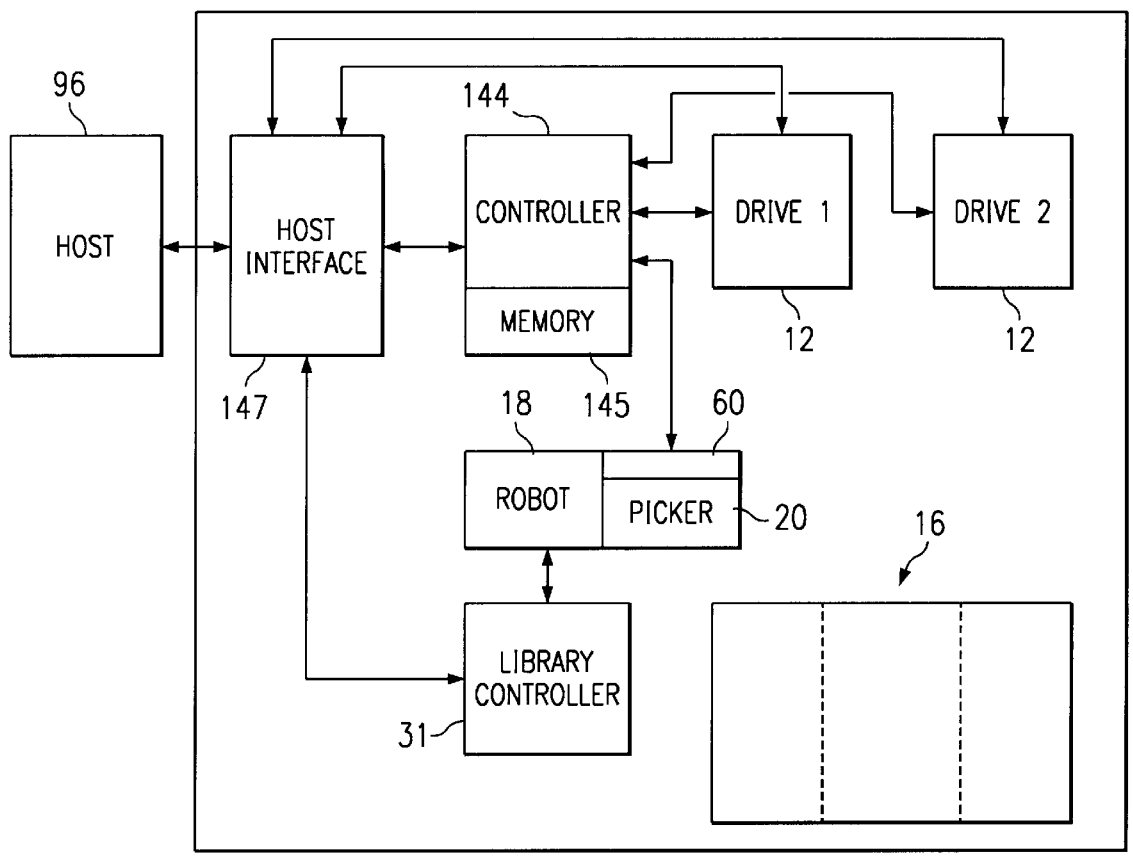
FIG. 7 is a block diagram representation of an embodiment of an automated data storage library of FIG. 1.

The library 10 of FIG. 1 is illustrated in block diagram form in FIG. 7. An embodiment of the picker 20 of accessor robot 18 is illustrated in FIG. 8.

Figure 8:
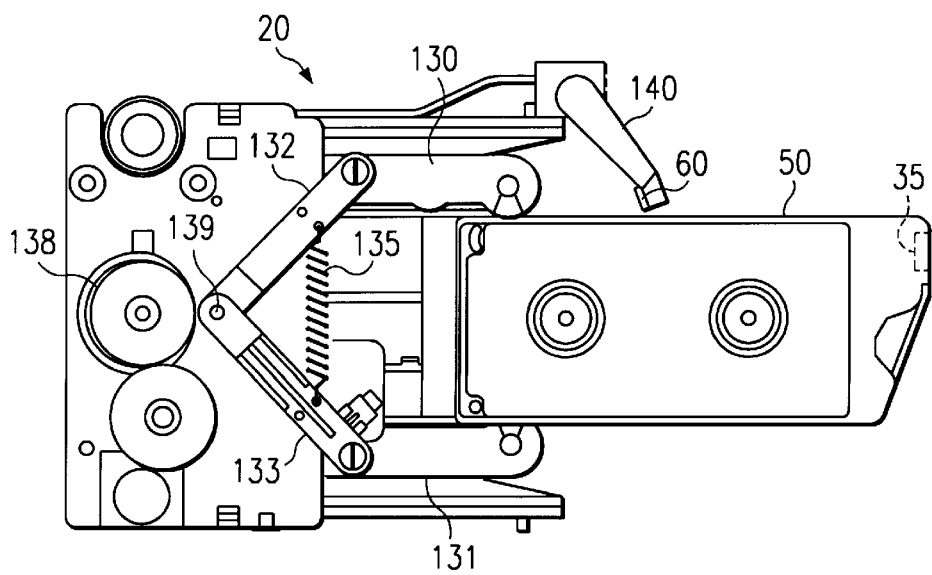
FIG. 8 is a plan view of an embodiment of an embodiment of a robot gripper employed in the automated data storage library of FIGS. 1 and 7.

In FIG. 8, the picker 20 comprises gripper fingers 130 and 131 which are operated by two arms 132 and 133. The arms are pulled by spring 135 to bring the fingers 130 and 131 into engagement with the side surfaces of the cartridge 50. Similar grippers may be employed with the cartridge 32 of FIGS. 2A and 2B. A cam 138 engages follower 139 to release the cartridge after it is delivered to the tape drive 12 or storage slot 16.

In the embodiment of FIG. 8, the memory interface 60 is mounted on a pivotable arm 140 so that, upon seating of the cartridge 50 in the picker 20 for transporting, the pivotable arm 140 positions the memory interface at the memory device 35 in the cartridge. Referring to FIGS. 7 and 8, the memory interface 60 transfers the device block map from the memory device 35 to a controller 144, which may be implemented in library controller 31. The controller 144 comprises a data processor and includes a memory 145. The controller processor may have the capability of processing the device block map. Otherwise, the controller 144 forwards the device block map over library host interface 147 to the host 96 for processing. The host (or controller) processor then processes the device block map to order the desired host-initiated retrieval read requests into an optimal order.

In accordance with the present invention, subsequently to positioning the memory device 35 at the memory interface 60, the tape cartridge is transported to the tape drive 12, the cartridge is loaded and the tape media is positioned for reading and/or writing, as discussed above.

Thus, the transfer of the device block map from the memory device and the processing of the device block map occurs while the robot accessor 18 transports the tape cartridge to the tape drive, and the tape drive loads the tape cartridge and positions the tape media for retrieval reading so that the processor begins the retrieval reading process immediately upon the positioning of the tape media. The reading and/or writing process is conducted by the tape drive 12 under the commands of the host 96, and the data is read and/or written by tape drive and the data is transferred directly with the host 96 over host interface 147.

Two embodiments of a method in accordance with the present invention are illustrated in the flow charts of FIGS. 9 and 10.

The flow chart of FIG. 9 comprises a cartridge load, whether the tape drive is located in an automated data storage library or is a stand alone tape drive. The tape drive may be that of FIGS. 5A and 5B for single reel cartridges or that of FIGS. 6A and 6B for two reel cartridges.

A cartridge load request 150 is received from the host 96. First, in step 151, the tape cartridge is positioned at memory interface 60. A processor, such as the host 96, requests that the data block map be read from the memory device 35 and transferred at the memory interface to the processor in step 152.

In accordance with the present invention, simultaneously, the processor processes the device block map for optimal file retrieval order in step 153 and the tape drive, or the loader mechanism positions the tape media for reading and/or writing in step 154. Thus, in step 155, the processor begins the retrieval reading process immediately upon the positioning of the tape media.

Upon completion of the retrieval reading and/or writing process, the processor issues a cartridge unload request in step 157. The processor causes the drive to update the device block map of memory device 35 over memory interface 60, in step 158. The cartridge is then unloaded from the drive in step 159 and the cartridge returned to the library storage slot or a removed from the drive.

The method of FIG. 10 relates to the embodiment of the library 10 depicted in FIG. 7.

In step 160, the host 96 requests that the library load a cartridge in a specified drive 12. The library controller 31 operates the robot accessor 18 to retrieve the selected cartridge from its storage slot 16 in step 161.

In accordance with the method of the present invention as illustrated in FIG. 10, steps 162, 163 and 164 are conducted simultaneously with steps 165 and 166. Step 162 comprises picker 20 positioning the cartridge memory device 35 at the memory interface 60, and step 163 comprises the transfer of the device block map (at the request of the processor, such as host 96) from the memory device 35 to the processor, so that, in step 164, the processor processes the device block map for an optimal file retrieval order. The simultaneously conducted steps comprise the robot accessor 18 moving the cartridge to the selected tape drive 12 in step 165, and, in step 166, the tape drive 12 positioning the tape media for reading and/or writing. Thus, in step 168, the processor begins the retrieval reading process immediately upon the positioning of the tape media.

Upon completion of the retrieval reading and/or writing process, the processor issues a library unload request in step 170. In step 170, the library controller 31 operates the drive 12 to unload the cartridge and operates robot accessor 18 to retrieve the selected cartridge from the tape drive 12. The robot accessor 18 positions the cartridge memory device 35 at the memory interface 60, in step 171, so that the processor updates the device block map of memory device 35 over memory interface 60, in step 172. Simultaneously with steps 171 and 172, in step 173, the robot accessor 18, under the control of the library controller 31, moves the cartridge from the tape drive 12 to a selected storage slot 16. The robot accessor, in step 175, then delivers the cartridge to the selected library storage slot 16.

Alternative steps embodying the method of the present invention may be envisioned by those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. A data storage system for use with a tape cartridge having a tape media for storing data in a serpentine pattern, and said tape cartridge having a memory device for storing a device block map for said tape media, comprising:
   a memory interface for transferring data with said memory device;
   a tape drive for reading and/or writing data on said tape media of said tape cartridge in said serpentine pattern, and for first positioning said tape cartridge at said memory interface and for subsequently positioning said tape media for said reading and/or writing thereby; and
   a processor coupled to said memory interface for processing said device block map from said memory device upon said positioning of said tape cartridge at said memory interface for optimal retrieval of said serpentine pattern data of said tape media by said tape drive for said reading and/or writing thereof.

2. The data storage system of claim 1, wherein said processor additionally updates said memory device device block map upon completion of said reading and/or writing of said tape media by said tape drive, and said memory interface transfers said updated device block map from said processor to said memory device of said tape cartridge.

3. The data storage system of claim 1, wherein said memory interface is mounted at said tape drive.

4. The data storage system of claim 3, wherein said memory interface transfers said device block map from said memory device to said processor as said tape drive positions said tape media for said reading and/or writing.

5. The data storage system of claim 3, wherein said tape drive comprises a tape head for reading and/or writing said tape media of said tape cartridge, and comprises a drive and servo arrangement for moving said tape media with respect to said tape head in said serpentine pattern, and wherein said tape drive positions said tape media at said tape head, and wherein said tape drive is coupled to said processor for operating said tape head and said drive and servo arrangement for positioning said tape media with respect to said tape head for said optimal retrieval of said serpentine pattern data.

6. The data storage system of claim 5, wherein said drive and servo arrangement of said tape drive additionally initializes the positioning of said tape media with respect to said tape head, wherein said memory interface transfers said device block map from said memory device to said processor as said tape drive positions said tape media at said tape head, and wherein said processor processes said device block map from said memory device as said drive and servo arrangement of said tape drive initializes the positioning of said tape media with respect to said tape head for said optimal retrieval of said serpentine pattern data of said tape media by said tape drive for said reading and/or writing thereof.

7. A data storage system for use with a tape cartridge having a tape media for storing data in a serpentine pattern, and said tape cartridge having a memory device for storing a device block map for said tape media, comprising:
   a memory interface for transferring data with said memory device of said tape cartridge;
   a tape drive for reading and/or writing data on said tape media of said tape cartridge in said serpentine pattern;
   a loading mechanism for first positioning said tape cartridge at said memory interface and for subsequently positioning said tape media at said tape drive for said reading and/or writing thereby; and
   a processor coupled to said memory interface for processing said device block map from said memory device upon said positioning of said tape cartridge at said memory interface for optimal retrieval of said serpentine pattern data of said tape media by said tape drive for said reading and/or writing thereof.

8. The data storage system of claim 7, wherein said processor additionally updates said memory device device block map upon completion of said reading and/or writing of said tape media by said tape drive, and said memory interface transfers said updated device block map from said processor to said memory device of said tape cartridge.

9. The data storage system of claim 7, wherein said memory interface is mounted at said loading mechanism.

10. The data storage system of claim 9, wherein said memory interface transfers said device block map from said memory device to said processor as said loading mechanism positions said tape media for said reading and/or writing.

11. The data storage system of claim 9, wherein said tape drive comprises a tape head for reading and/or writing said tape media of said tape cartridge, and comprises a drive and servo arrangement for moving said media with respect to said tape head in said serpentine pattern, and wherein said loading mechanism positions said tape cartridge at said tape drive, and thereby said tape media at said tape head, and wherein said tape drive is coupled to said processor for operating said tape head and said drive and servo arrangement for positioning said tape media with respect to said tape head for said optimal retrieval of said serpentine pattern data.

12. The data storage system of claim 11, wherein said drive and servo arrangement of said tape drive additionally initializes the positioning of said tape media with respect to said tape head, wherein said memory interface transfers said device block map from said memory device to said processor as said loading mechanism positions said tape cartridge at said tape drive, and wherein said processor processes said device block map from said memory device as said drive and servo arrangement of said tape drive initializes the positioning of said tape media with respect to said tape head for said optimal retrieval of said serpentine pattern data of said tape media by said tape drive for said reading and/or writing thereof.

13. A data storage library for use with a plurality of tape cartridges, each said tape cartridge having a tape media for storing data in a serpentine pattern, and said tape cartridge having a memory device for storing a device block map for said tape media, comprising:

a plurality of storage slots for storing said tape cartridges;

at least one tape drive for reading and/or writing data on said tape media of said tape cartridge in said serpentine pattern, and for positioning said tape media for said reading and/or writing thereby;

a memory interface for transferring data with said memory device of said tape cartridge;

a robotic accessor for moving said tape cartridges amongst said storage slots and said at least one tape drive, said robotic accessor first positioning said tape cartridge at said memory interface, said at least one tape drive subsequently positoning said tape media for said reading and/or writing; and a processor coupled to said memory interface for processing said device block map from said memory device upon said positioning of said tape cartridge at said memory interface for optimal retrieval of said serpentine pattern data of said tape media by said tape drive for said reading and/or writing thereof.

14. The data storage library of claim 13, wherein said processor additionally updates said memory device device block map upon completion of said reading and/or writing of said tape media by said tape drive, and said memory interface transfers said updated device block map from said processor to said memory device of said tape cartridge.

15. The data storage library of claim 13, wherein said memory interface is mounted at said robotic accessor.

16. The data storage library of claim 15, wherein said memory interface transfers said device block map from said memory device to said processor as said robotic accessor moves said tape cartridge to said tape drive.

17. The data storage library of claim 15, wherein said tape drive comprises a tape head for reading and/or writing said tape media of said tape cartridge, and comprises a drive and servo arrangement for moving said tape media with respect to said tape head in said serpentine pattern, and wherein said tape drive positions said tape media at said tape head, and wherein said tape drive is coupled to said processor for operating said tape head and said drive and servo arrangement for positioning said tape media with respect to said tape head for said optimal retrieval of said serpentine pattern data.

18. The data storage system of claim 17, wherein said drive and servo arrangement of said tape drive additionally initializes the positioning of said tape media with respect to said tape head, wherein said memory interface transfers said device block map from said memory device to said processor as said robotic accessor moves said tape cartridge to said tape drive, and wherein said processor processes said device block map from said memory device as said drive and servo arrangement of said tape drive initializes the positioning of said tape media with respect to said tape head for said optimal retrieval of said serpentine pattern data of said tape media by said tape drive for said reading and/or writing thereof.

19. A method for accessing data stored in a tape cartridge for reading and/or writing said data, said tape cartridge having a tape media for storing said data in a serpentine pattern, said tape cartridge having a memory device storing a device block map for said serpentine pattern stored data, comprising the steps of:

positioning said tape cartridge at a memory interface which transfers data with said memory device;

transferring said stored device block map from said memory device at said memory interface to a processor;

said processor processing said device block map from said memory device for optimal retrieval of said serpentine pattern stored data of said tape media for said reading and/or writing thereof; and positioning said tape media for said reading and/or writing of said serpentine pattern stored data.

20. The method of claim 19, comprising the additional step of:

upon completion of said reading and/or writing, updating said device block map of said memory device.

21. The method of claim 19, wherein said tape cartridge is stored in one of a plurality of storage slots of an automated data storage library having a robotic accessor for moving said tape cartridge amongst said storage slots and at least one tape drive, said method comprising the additional initial step of said robotic accessor moving said tape cartridge to said tape drive, and wherein said memory interface is at said robotic accessor, and said steps of positioning said tape cartridge at said memory interface, and of transferring said stored device block map from said memory device at said memory interface to a processor, are conducted during said initial step.

22. The method of claim 21, comprising the additional steps of:

upon completion of said reading and/or writing, positioning said tape cartridge at said memory interface;

said processor updating said device block map of said memory device; and said robotic accessor moving said tape cartridge from said tape drive to one of said plurality of storage slots.

* * * * *